(12) United States Patent
Roland et al.

(10) Patent No.: US 10,060,730 B2
(45) Date of Patent: Aug. 28, 2018

(54) SYSTEM AND METHOD FOR MEASURING BY LASER SWEEPS

(71) Applicants: Robert Bosch GmbH, Stuttgart (DE); Matthias Roland, Sunnyvale, CA (US); Benjamin Pitzer, Menlo Park, CA (US); Philip Roan, San Francisco, CA (US); Ralph Dammertz, Gerlingen (DE); Hauke Schmidt, Menlo Park, CA (US); Alexander Flaig, Stuttgart (DE)

(72) Inventors: Matthias Roland, Sunnyvale, CA (US); Benjamin Pitzer, Menlo Park, CA (US); Philip Roan, San Francisco, CA (US); Ralph Dammertz, Gerlingen (DE); Hauke Schmidt, Menlo Park, CA (US); Alexander Flaig, Stuttgart (DE)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 188 days.

(21) Appl. No.: 15/033,011

(22) PCT Filed: Oct. 30, 2014

(86) PCT No.: PCT/US2014/063144
§ 371 (c)(1),
(2) Date: Apr. 28, 2016

(87) PCT Pub. No.: WO2015/066319
PCT Pub. Date: May 7, 2015

(65) Prior Publication Data
US 2016/0282107 A1    Sep. 29, 2016

Related U.S. Application Data

(60) Provisional application No. 61/898,696, filed on Nov. 1, 2013, provisional application No. 61/910,348, filed on Nov. 30, 2013.

(51) Int. Cl.
*G01C 3/08*    (2006.01)
*G01B 11/14*    (2006.01)
(Continued)

(52) U.S. Cl.
CPC .......... *G01B 11/14* (2013.01); *G01B 11/026* (2013.01); *G01B 11/24* (2013.01); *G01C 3/08* (2013.01);
(Continued)

(58) Field of Classification Search
CPC ....... G01B 11/14; G01B 11/026; G01B 11/24; G01C 3/08; G01S 7/4808; G01S 17/023; G01S 17/42; G01S 17/89
See application file for complete search history.

(56) References Cited

U.S. PATENT DOCUMENTS 7,586,585 B2   9/2009  Siercks
2005/0038627 A1  2/2005  Brimhall et al.
(Continued)

FOREIGN PATENT DOCUMENTS

DE  10 2008 054 453 A1  6/2010
EP   1 669 776 A1       6/2006

OTHER PUBLICATIONS

International Search Report corresponding to PCT Application No. PCT/US2014/063144, dated Jan. 28, 2015 (3 pages).
(Continued)

*Primary Examiner* — Samantha K Abraham
(74) *Attorney, Agent, or Firm* — Maginot, Moore & Beck LLP

(57) ABSTRACT

A method of performing geometrical measurements of remote objects includes performing a laser sweep of a measurement object with a handheld sensor device including a distance measurement unit and an inertial measurement unit. The method includes activating the distance measure-
(Continued)

ment unit to perform a plurality of distance measurements during the laser sweep, and activating the inertial measurement unit to perform an inertial measurement in association with each of the distance measurements. A processor is used to process the distance measurements with reference to the associated inertial measurements to determine a geometric characteristic of the measurement object.

13 Claims, 16 Drawing Sheets

(51) Int. Cl.
  *G01S 17/89* (2006.01)
  *G01B 11/02* (2006.01)
  *G01S 17/02* (2006.01)
  *G01B 11/24* (2006.01)
  *G01S 17/42* (2006.01)
  *G01S 7/48* (2006.01)

(52) U.S. Cl.
  CPC .......... *G01S 7/4808* (2013.01); *G01S 17/023* (2013.01); *G01S 17/42* (2013.01); *G01S 17/89* (2013.01)

(56) References Cited

U.S. PATENT DOCUMENTS

| | | |
|---|---|---|
| 2008/0231827 A1* | 9/2008 | Siercks .................. G01S 17/08 356/4.01 |
| 2009/0245653 A1 | 10/2009 | Kochi et al. |
| 2011/0006772 A1 | 1/2011 | Olsson et al. |
| 2011/0288818 A1 | 11/2011 | Thierman et al. |
| 2012/0033069 A1* | 2/2012 | Becker .................... G01S 17/89 348/135 |
| 2013/0278755 A1 | 10/2013 | Starns et al. |
| 2014/0022064 A1* | 1/2014 | Ito .......................... G06F 3/016 340/407.2 |
| 2015/0056920 A1* | 2/2015 | Huttunen ................ H04B 7/26 455/41.2 |

OTHER PUBLICATIONS

International Search Report corresponding to EP Application No. EP 14 85 794, dated May 18, 2017 (English language document) (8 pages).

* cited by examiner

MEASURING FROM THE FRONT EDGE OF THE MEASURING TOOL (E.G., AS WHEN MEASURING FROM A CERTAIN POINT ONWARD)

MEASURING FROM THE REAR EDGE OF THE MEASURING TOOL (E.G., WHEN PLACING THE TOOL FLUSH AGAINST A WALL)

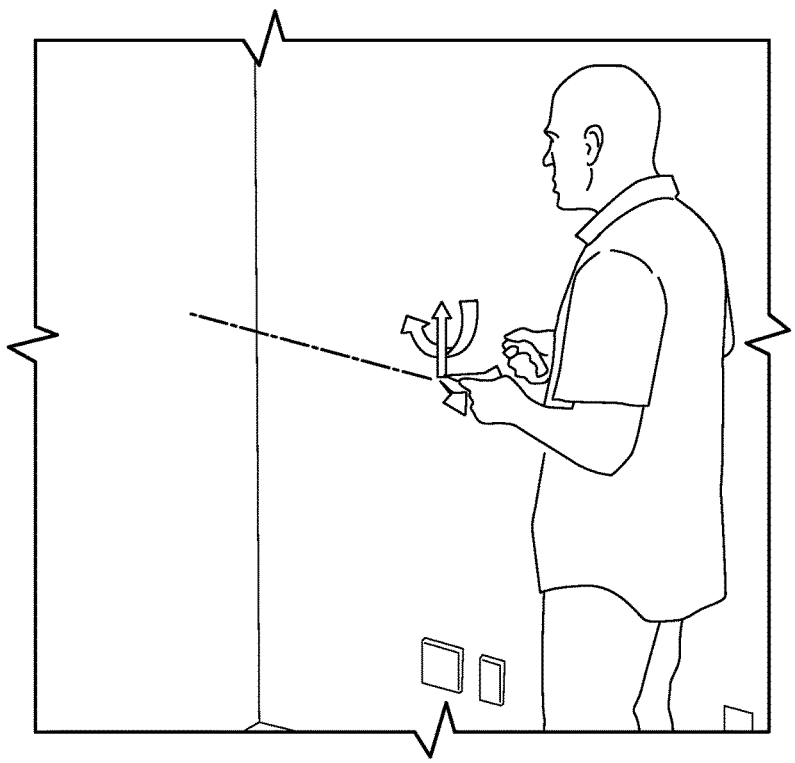
FIG. 18
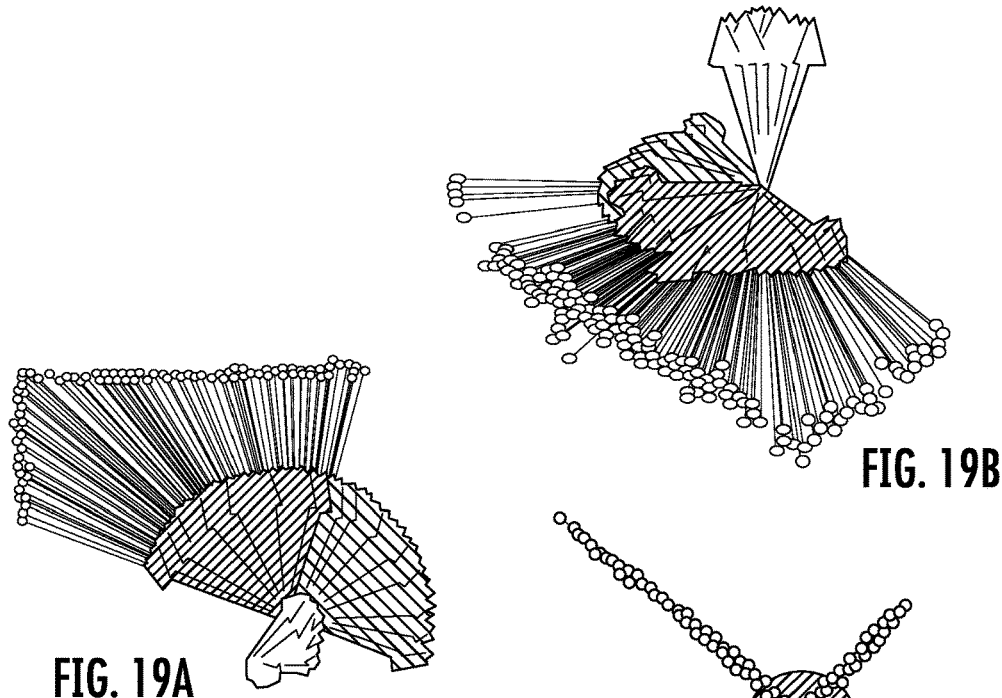
FIG. 19A
FIG. 19B
FIG. 19C

SYSTEM AND METHOD FOR MEASURING BY LASER SWEEPS

CROSS-REFERENCE TO RELATED APPLICATIONS

This application is a 35 U.S.C. § 371 National Stage Application of PCT/US2014/063144, filed on Oct. 30, 2014, which claims the benefit of priority to U.S. Provisional Application Ser. No. 61/898,696 entitled "SYSTEM AND METHOD FOR MEASURING BY LASER SWEEPS" by Roland et al., filed Nov. 1, 2013, and U.S. Provisional Application Ser. No. 61/910,348 entitled "SYSTEM AND METHOD FOR MEASURING BY LASER SWEEPS" by Roland et al., filed Nov. 30, 2013, the disclosures of which are each hereby incorporated by reference herein in their entirety.

TECHNICAL FIELD

The disclosure is related generally to devices for measuring distances, angles, and areas using lasers, and particularly to systems and methods for using lasers to measure distances, angles, and areas.

BACKGROUND

The accurate measurement of distances, angles and areas is of high interest for architects, real estate agents, craftsmen and do-it-yourself people in private households. They all need the actual dimensions of walls, objects, rooms and buildings to prepare and execute their planned work (e.g. installation of kitchens, windows, planning of room paintings, etc.). An intuitive and appealing way of collecting, manipulating, and visualizing the recorded measurements is important to make the measurement task efficient and joyful.

All range finder devices currently available on the market measure distances from the device itself to a target point chosen by the user. The measuring principle is based on a signal that is emitted from the devices, redirected at the surface around the target point, and received by the device again (see FIG. 1). For example, to measure the length of a wall the user places the device parallel to the wall and uses a neighboring wall as target. FIGS. 2 and 3 display two options using different reference points for measuring.

In modern engineering laser scanners are used for distance measurements in a variety of applications. FIG. 4 displays the working principle of a laser scanner. Most laser scanners use moveable mirrors to steer the laser beam. A precise steering of laser beams enables distance measurements at every pointing direction. This method, often called 3D object scanning or 3D laser scanning, is used to rapidly capture shapes of objects, buildings and landscapes. How fast scans can be developed is affected by the speed at which the mirror can be adjusted.

DRAWINGS

FIG. 18 depicts the user sweeping the device across two adjacent walls to perform an indirect angle measurement.

FIGS. 19A and 19B depict the data points generated during the process FIG. 18 for straight line movement and straight line with rotational motion, respectively.

FIG. 19C depicts the estimate for two lines corresponding to the two walls of FIG. 18 from the data generated during the process of FIG. 18.

Figure 28:
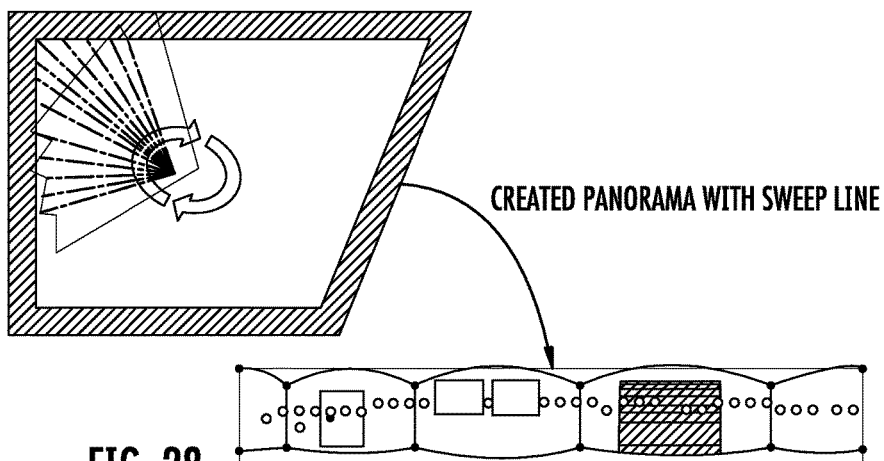

FIG. 28 schematically depicts the simultaneous capture of image data and laser range values which allow calibration and object measurements at the same time.

Figure 29:
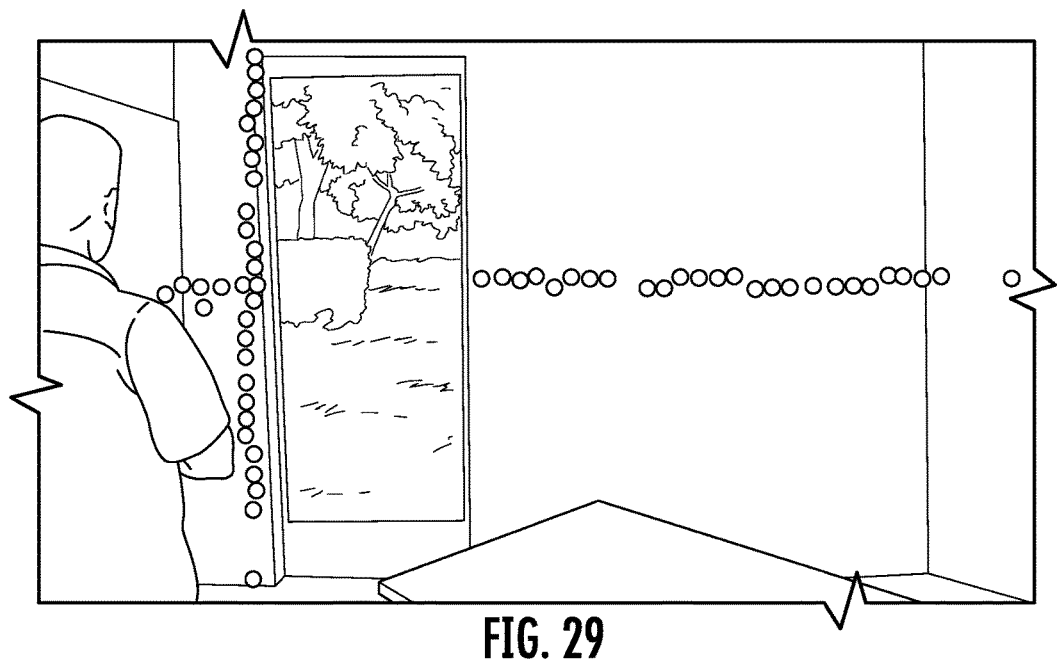

FIG. 29 depicts a user performing a horizontal and a vertical sweep of the same wall.

Figure 30:
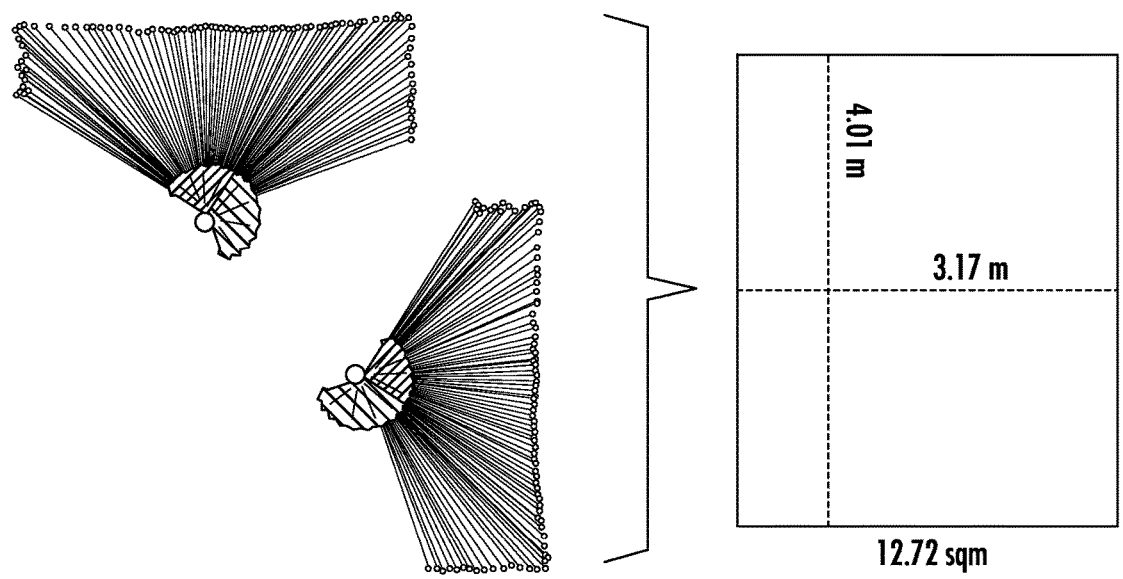

FIG. 30 schematically depicts the data points generated and the measurements corresponding to the data points.

Figure 31:
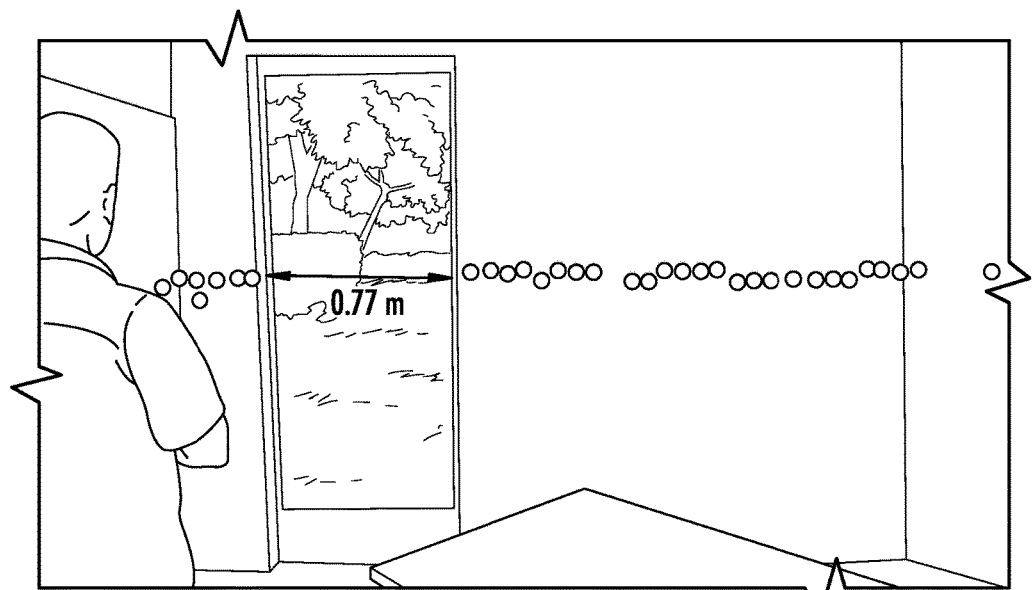

FIG. 31 depicts a user performing a horizontal sweep of a wall with a door with negative response of the sweep being used to indicate the position and dimensions of the door.

Figure 32:
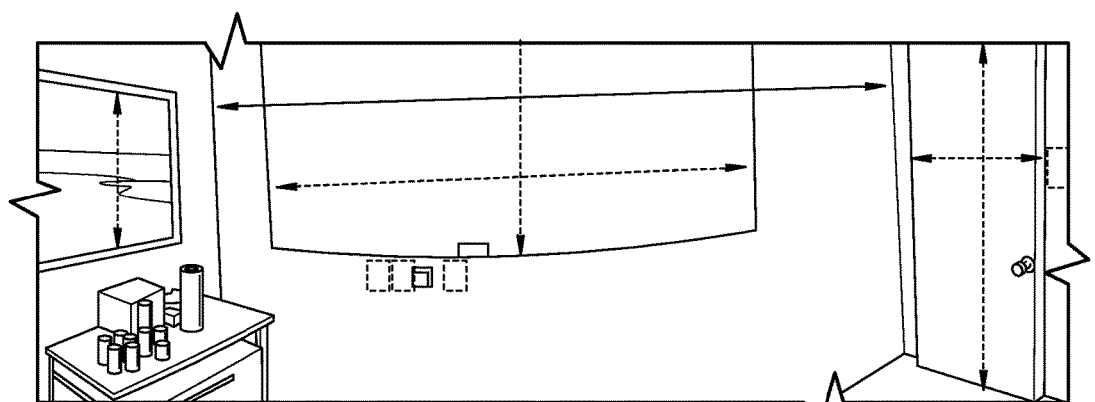

FIG. 32 depicts an image showing the various object dimensions that can be detected and measured.

Figure 33:
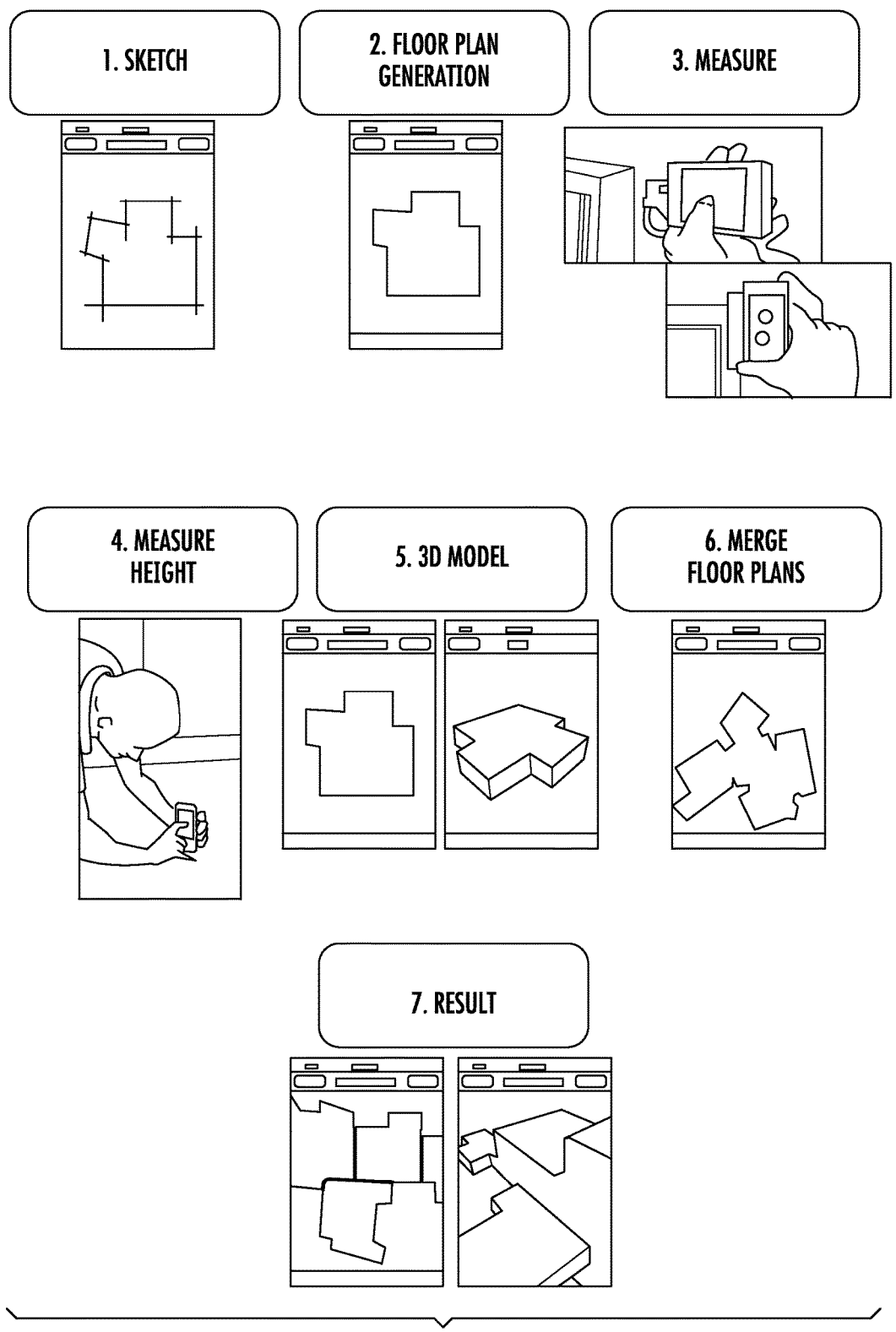

FIG. 33 depicts a process flow for a method of generating a 2D floor plan and a 3D model for a building that can be implemented by the laser sweep system.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

In one embodiment, a handheld sensing device is provided. The handheld sensing device comprises a portable housing defining a measurement direction. A distance measurement unit is supported by the housing and configured to measure a distance to a remote point in the measurement direction. An inertial measurement unit is also supported by the housing and configured to perform an inertial measurement in association with each distance measurement. The device also includes a processor configured to process the distance measurements with reference to the associated inertial measurements to determine a geometric characteristic of a measurement object.

A method of using the handheld sensing device comprises performing a laser sweep of a measurement object with the handheld sensing device. The method includes activating the distance measurement unit is to perform a plurality of distance measurements during the laser sweep and activating the inertial measurement unit to perform an inertial measurement in association with each of the distance measurements. A processor is used to process the distance measurements with reference to the associated inertial measurements to determine a geometric characteristic of the measurement object.

The distance measurement unit may comprise an optical sensing device, such as a laser range finder. The inertial measurement unit comprises inertial sensing devices, such as one or more accelerometers, gyroscopes, and/or compasses, that are configured to detect a position and orientation of the handheld measuring device. The distance measurement unit and the inertial measurement unit may be activated at high frequencies to take measurements, e.g., at least 30 Hz. The processor may be configured to use prior knowledge to enhance the accuracy of measurements. Prior knowledge may include user characteristics, such as forearm length and wrist to sensor distances, and may also include certain assumptions, such as the measurement points being located in plane (which is typically the case when measuring a wall).

The processor may be configured to perform various functions using the measured data from the distance measurement unit and the inertial measurement unit. The functions may be defined by programmed instructions stored in an electronic memory. The programmed instructions may include instructions for causing the processor to generate a 3D point collection for the measurement object from the distance measurements and the associated inertial measurements and to store the 3D point collection in the memory, to process the distance measurements with reference to the associated inertial measurements to determine a dimension of a surface of the measurement object, and/or to process the distance measurements with reference to the associated inertial measurements to indirectly determine an angle between two surfaces of the measurement object.

The handheld sensor device may be operated via a user interface which may be incorporated into the housing of the device. The user interface may comprise any suitable type of device capable of inputting commands and data to the processor. The user interface may include a touch screen display that enables a visualization of the data measurements and processed data. In this case, the processor is configured to process the distance measurements and inertial measurements to generate images or graphics which depict the data in a user friendly manner.

In one embodiment, the handheld measuring device includes a communication system which enables data to be wirelessly transmitted and received to and from a remote device, such as a smart device, smart phone, tablet, or computer. The remote device may be configured to provide further processing and visualization capabilities for the measured data.

The handheld sensing device may further comprise an image capturing device, such as a camera, for capturing images of the measurement object. The processor may be configured to process the captured images to form a panoramic image of the measurement object. The processor may also be configured to associate measured points to the corresponding points in the panoramic image.

Figure 1:
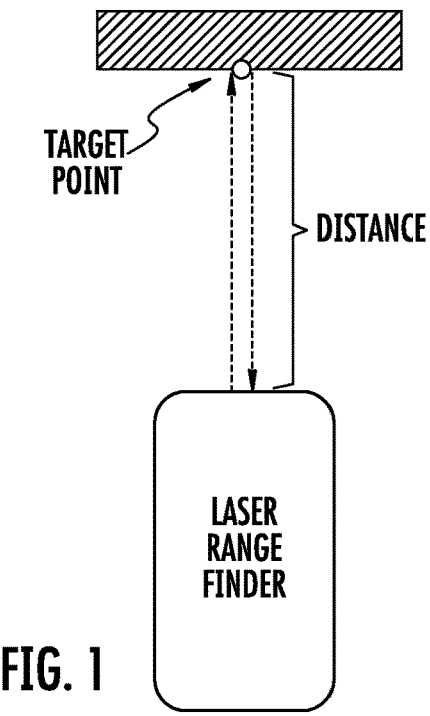
FIG. 1 is a schematic illustration of a laser range finder.
Figure 2:
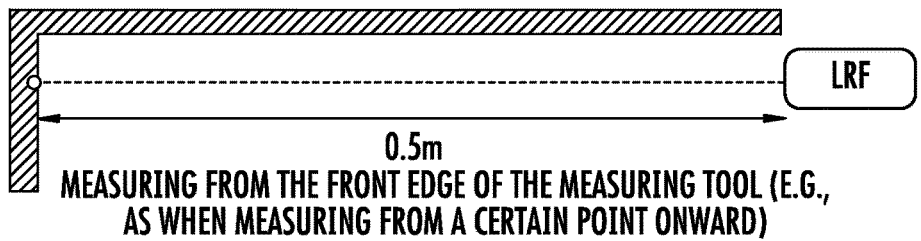
FIGS. 2 and 3 are schematic illustrations of methods for measuring distance using a laser range finder, such as depicted in FIG. 1.
Figure 3:
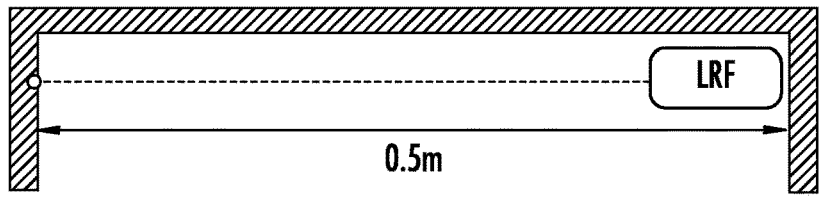
Figure 4:
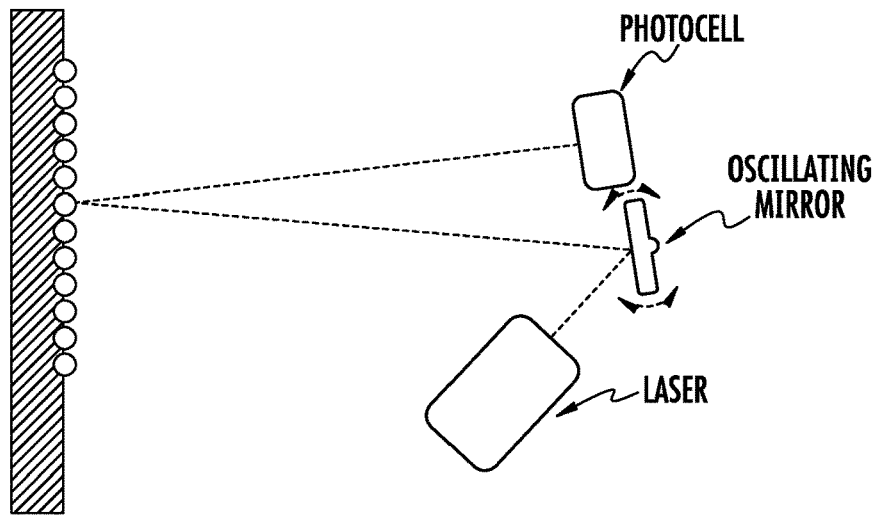
FIG. 4 is a schematic illustration of a laser scanner.
Figure 5:
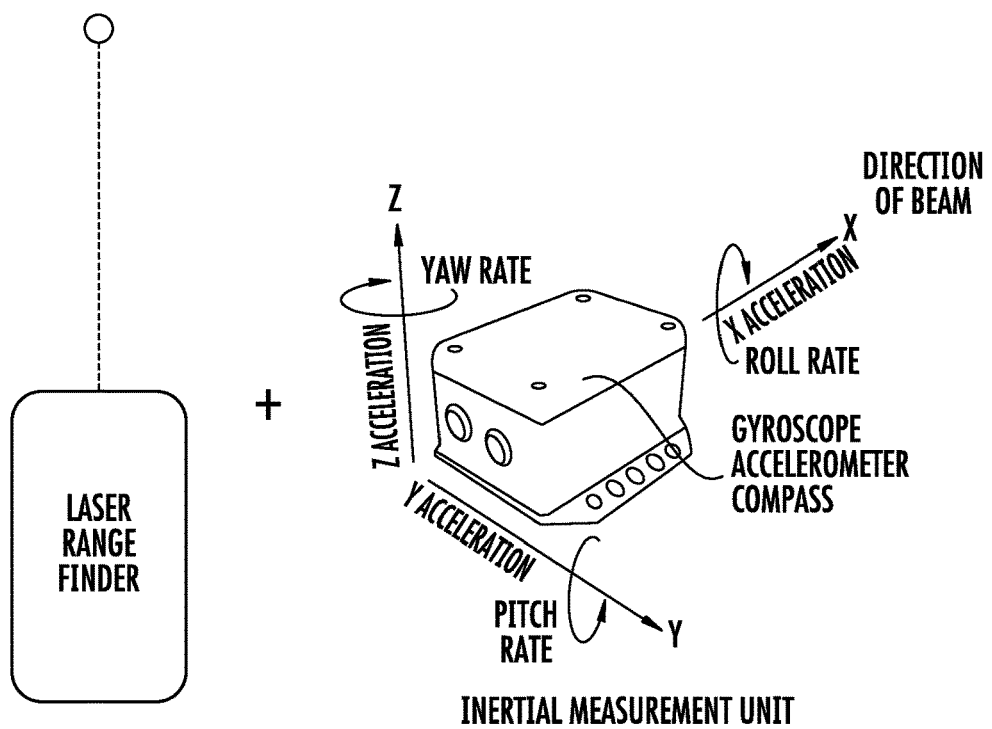
FIG. 5 is a schematic illustration of a laser sweep device in accordance with the present disclosure.

Referring to FIG. 5, the disclosure proposes systems and methods for combining a fast measuring Laser Range Finder (LRF) with an Inertial Measurement Unit (IMU) into a single unit (FIG. 6) to enable laser scanning using hand gestures. As explained below, the systems and methods of combining the precise distance measures of an LRF with inertial measurements from an IMU accelerometer, gyroscope, and compass indirect measurements of distances and angles produced by the LRF and IMU enables a user of such a hand-held device to create three dimensional laser scans.

Figure 6:
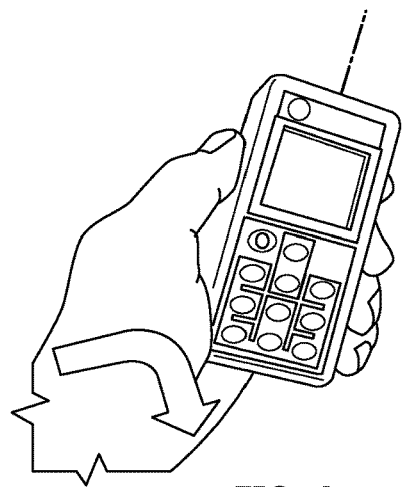
FIG. 6 depicts a handheld device for implementing at least a laser range finder for the laser sweep device.
Figure 7:
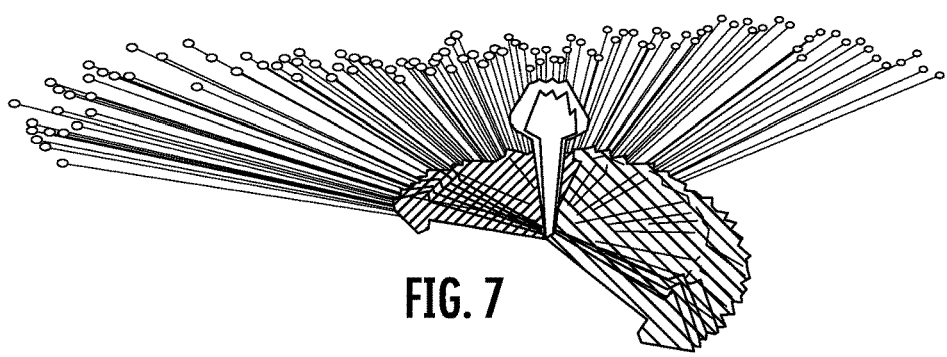
FIG. 7 is a schematic illustration of the lasers and data points produced by the device of FIG. 6 as it is being swept across a surface, such as a wall, by a user in a straight line.
Figure 8:
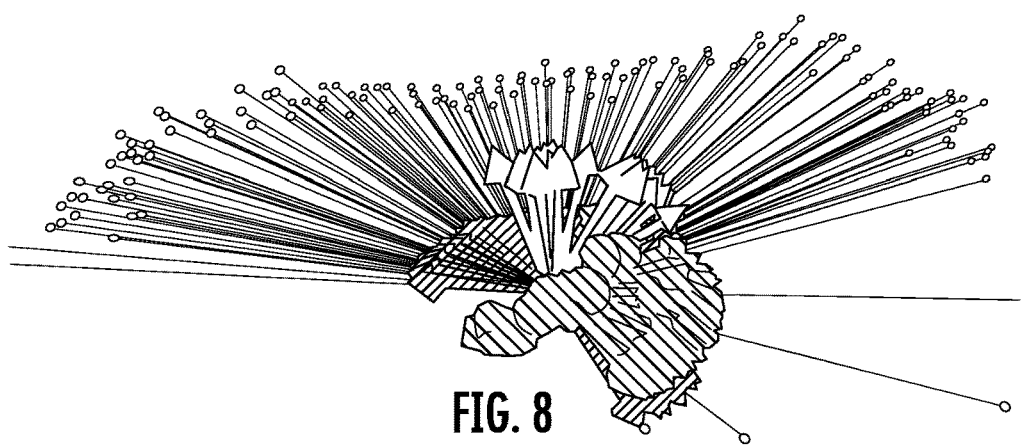
FIG. 8 is a schematic illustration of the lasers and data points produced by the device of FIG. 6 as it is being swept across a surface, such as a wall, by a user in a line with rotation motions.

Referring to FIGS. 6-8, the IMU is rigidly attached to the LRF and continuously measures its velocity, orientation, and the gravitational force as the device is moved by an operator. With well known techniques, those measurements can be combined to track the 3D position and 3D orientation (6 Degree-of-Freedom (6DoF) pose) of the laser range finder.

Combining the 3D motion tracking and a fast measuring laser range finder allows the collection of distance measurements to be synchronized with 6DoF pose measurements at a high frequency (e.g. 30 Hz). Applying the 6DoF poses to the corresponding distance measures yields to a collection of 3D point positions. In case the user does a sweep-like hand gesture the resulting 3D point collection looks approximately like a single 2D scan line gathered from a 2D laser scanner (FIG. 7).

As used herein, a sweep-like hand gesture combined with the underlying data processing of motion tracking and fast scanning is referred to herein a "laser sweep". The sweep gesture itself does not require a larger translational motion and is itself rather fast (<1 sec). Using advanced filter methods in combination with rather short and mainly rotational motions lead to accurate and stable 6DoF pose estimations (FIG. 8).

To make the motion estimation even more robust and accurate, further prior knowledge can be incorporated into the measurements. For example, the velocity of the hand motion is zero whenever the user switches the direction of rotation; the length of the forearm can be determined and used in cases of sweep gestures which rotate around the elbow; the distance between wrist and laser range finder can be determined and used in case of a wrist-based sweep gesture; and 3D points can be assumed to form clusters on planes (walls) in indoor environments. Fusing such prior knowledge in a sophisticated motion estimation framework leads to a stable pose estimation of the laser range finder while performing a laser sweep. The integration of further knowledge, however, is optional and not required to perform single distance, angle, and area measurements or generated 2D floor plans and 3D room reconstructions.

Figure 27:
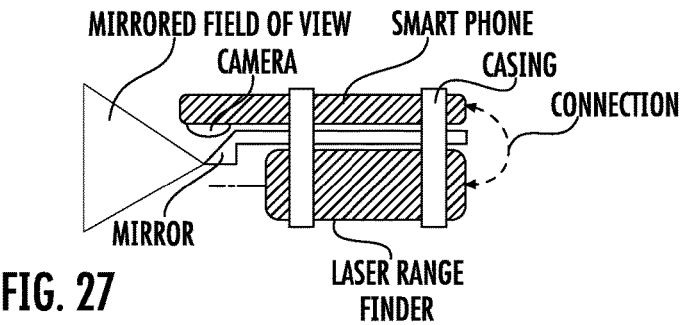
FIG. 27 shows a smart phone and a laser range finder connected by a smart phone accessory to form a laser sweep system.

The hardware setup for a laser sweep system comprises an advanced laser range finder with an additional inertial measurement unit to track the motion of the laser device and a fast scanning mode to measure distances with a high frequency. These devices can be combined into the same housing to form a single hand-held unit. Alternatively, the LRF and IMU functionality may be provided in separate devices that are connected together. For example, the LRF may be provided in one device and the IMU may be implemented in a separate device, such as smart phone. A smart phone accessory may be configured to physically connect the smart phone and LRF (See, e.g., FIG. 27). Alternatively, separate devices may be connected via a suitably fast connection which can be wireless, e.g., Bluetooth, or wired, e.g., serial cable.

Figure 9:
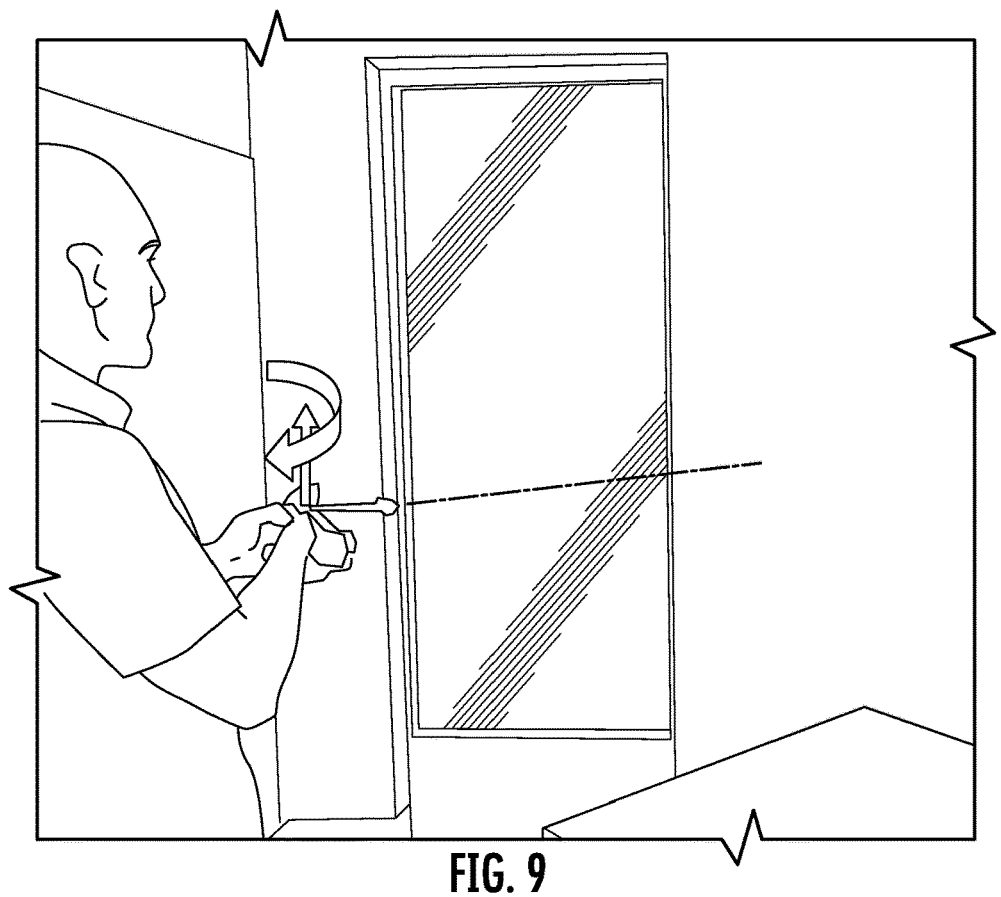
FIG. 9 depicts a user sweeping the device across an object to perform indirect single distance measurements.
Figure 10:
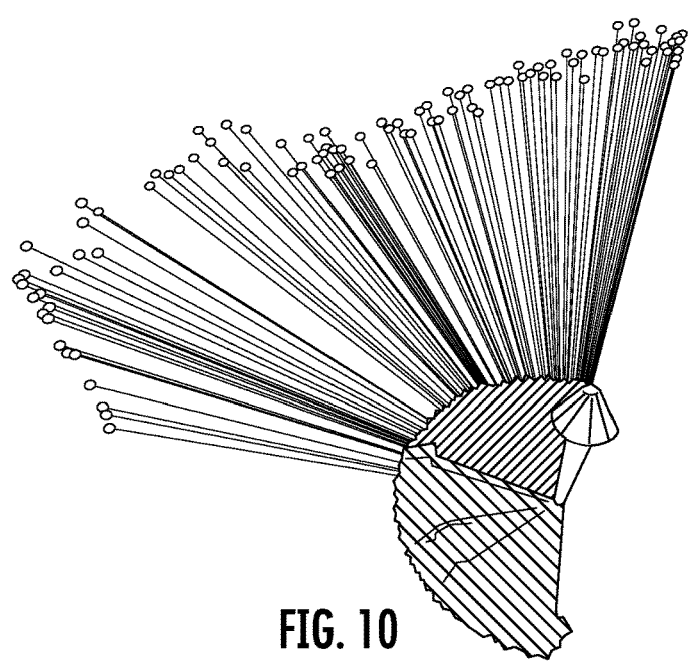
FIG. 10 is a schematic illustration of the lasers and data points produced by the device during the process of FIG. 9.

A laser sweep system, such as described above, enables indirect single distance measurements using laser sweep technology. An example of an indirect distance measurement is the measurement of single wall dimensions. The user needs to sweep the laser over the wall (FIG. 9) to collect a set of 3D points lying on the wall (FIG. 10).

Figure 11:
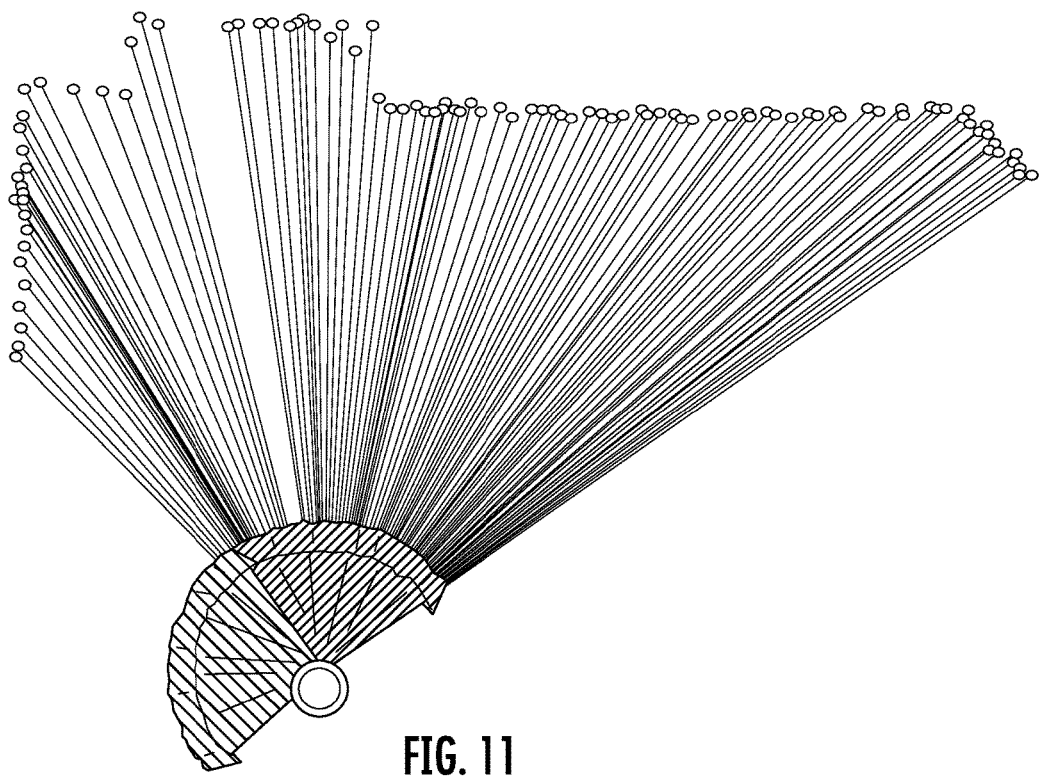
FIG. 11 shows the data points of FIG. 10 after being adjusted to horizontal based on inertial sensor data.
Figure 12:
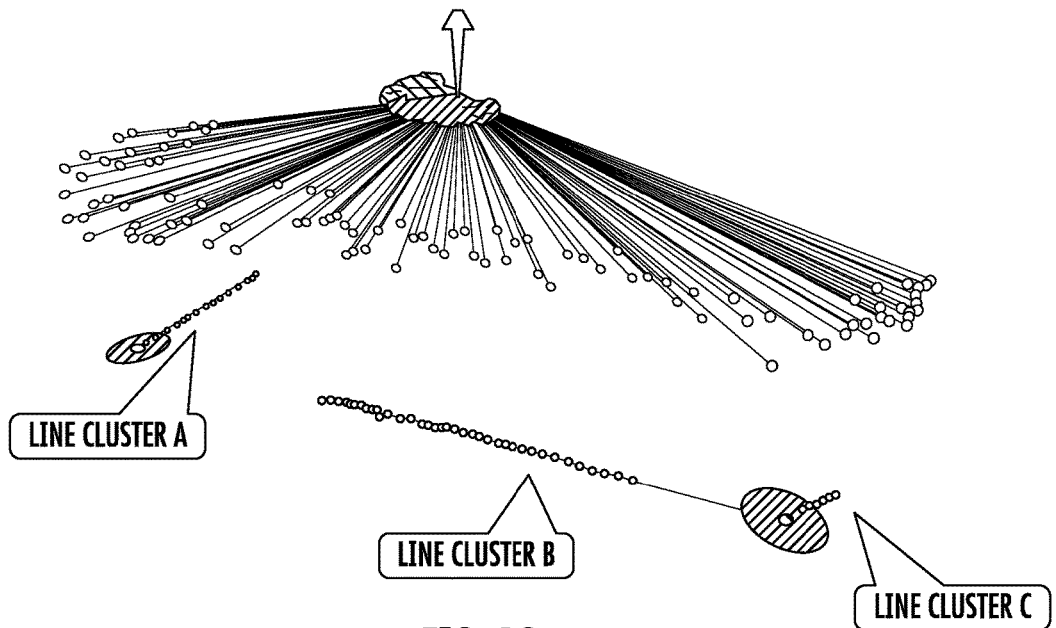
FIGS. 12 and 13 show the data points of FIG. 11 after further processing in accordance with the present disclosure.

The next step is to reduce the collection of 3D points to a collection of 2D points. This can be done by projecting all points onto a plane using an orthogonal projection. Based on accelerometer measurements (gravity) and the assumption that the user is attempting to measure a horizontal distance (wall width) the best plane for projection is the plane described by the floor. This projection leads to a birds-eye view of the generated data (FIG. 11). The next step towards getting the dimensions of the measured wall is a detection and segmentation of lines in the 2D point set. Using robust line detection algorithms like RANSAC or Hough transform, the number of 2D point clusters containing 2D points which all correspond to the same 2D line can be estimated (FIG. 12).

Figure 13:
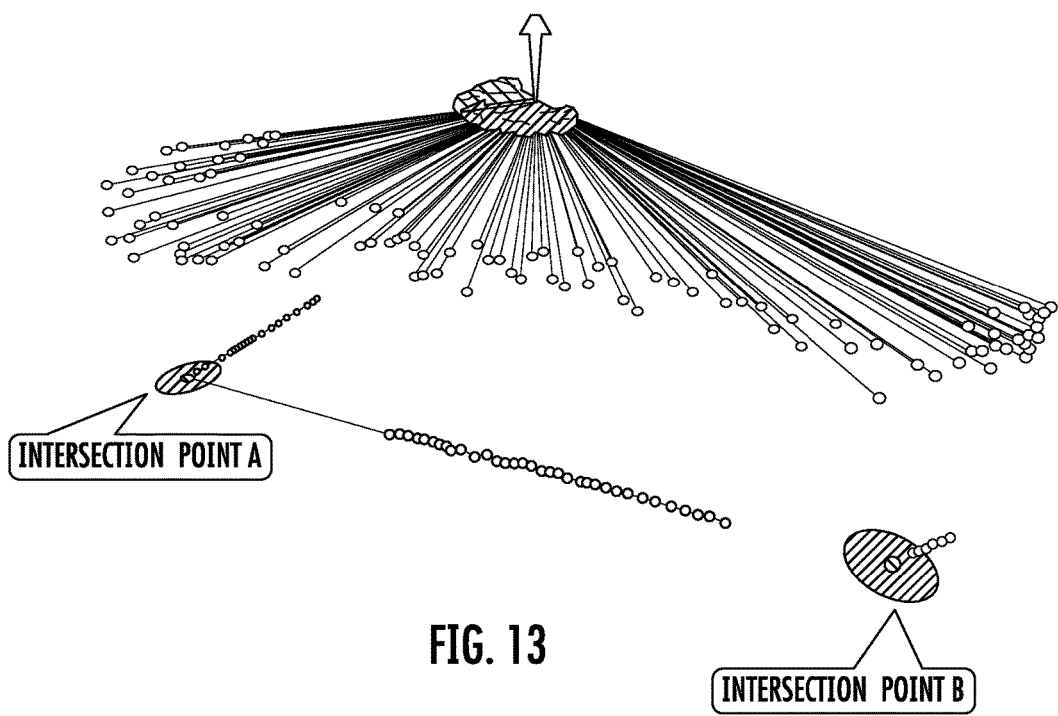

By fitting 2D lines (linear least-squares or non-linear optimization like Levenberg-Marquardt) to the pointsets for each 2D point cluster, accurate estimates for the corresponding 2D lines can be attained. Based on these lines, accurate intersection points between lines can then be computed (FIG. 13). These intersection points correspond to corners between two adjacent walls in the real world. Finally, the Euclidean distance between those intersection points is estimated to get a measure for the dimension of the wall.

Figure 14:
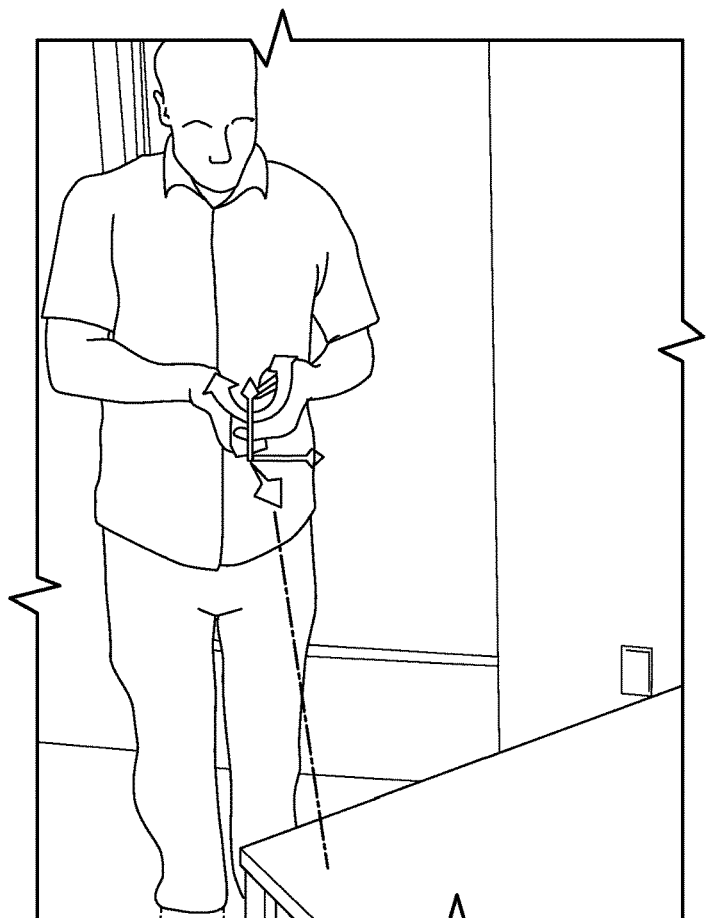
FIG. 14 depicts a user sweeping the device across other objects in the room to perform measurements.
Figure 15:
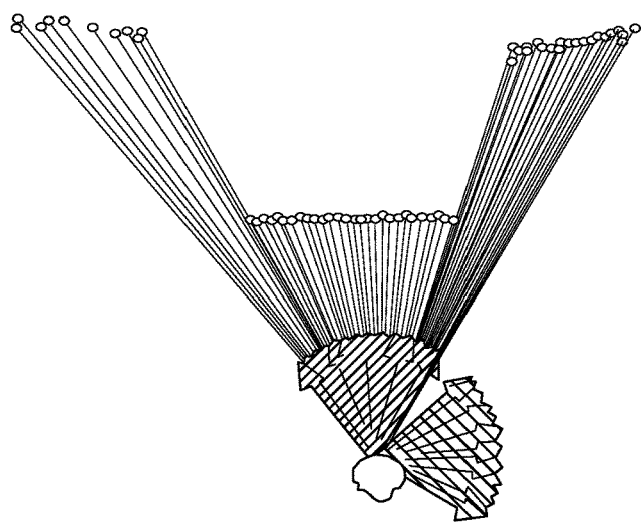
FIG. 15 depicts the data points generated by the sweep of FIG. 14.
Figure 16:
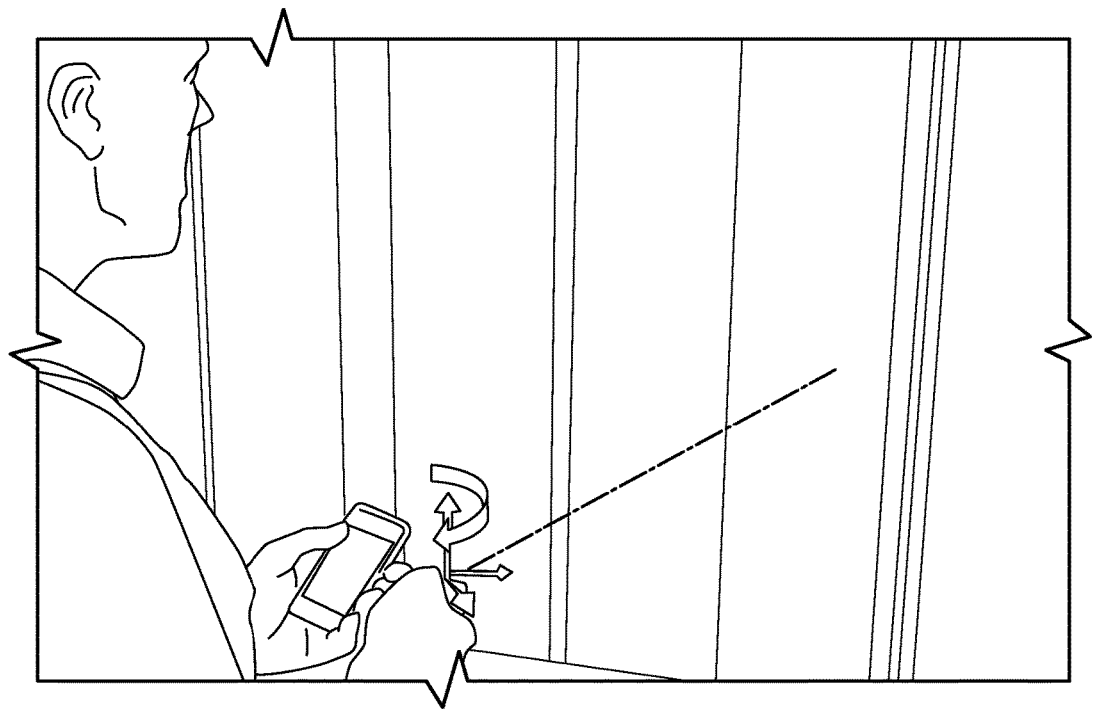
FIG. 16 depicts the user sweeping the device across small dimension objects in the room to perform measurements.
Figure 17:
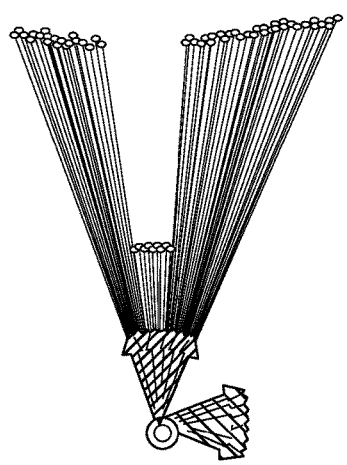
FIG. 17 depicts the data points generated by the sweep of FIG. 15.

Using this kind of indirect measurement of distances brings a number of advantages over the traditional way of measuring distances with a laser range finder. For example, the user does not have to go into a room corner and hold the laser range finder attached to one wall while measuring the distance to the opposite wall. The user just needs to stand in front of the wall and sweeps the laser over the wall by doing a simple hand gesture. The user is also able to measure the dimensions of other objects (e.g. width of a table, FIGS. 14 and 15) as well as the dimensions of small features (e.g., FIGS. 16 and 17) without any further effort. Based on the high amount of available and redundant data, accurate estimates for the measured dimensions can be provided.

Similar to the described indirect distance measurement, a laser sweep with the device enables an indirect measurement of angles, e.g. the angle between two adjacent walls (FIG. 18). The user just needs to sweep the laser over the two adjacent walls. Based on this sweep data and the already mentioned line segmentation and fitting algorithms (FIGS. 19a, 19b), an estimate for two accurate 2D lines for the two involved walls can be determined (FIG. 19c).

By estimating the inclusive angle between those lines we estimate the inclusive angle between the two adjacent walls.

Figure 20:
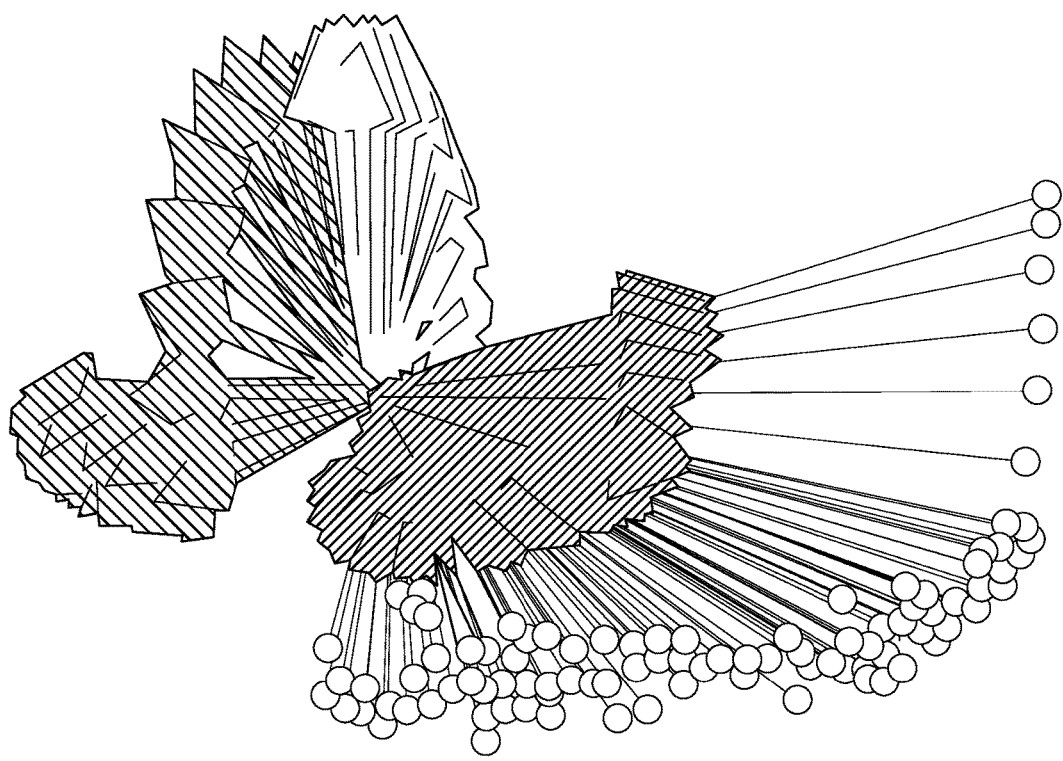
FIG. 20 depicts the data points generated during a sweep of walls having a 140° angle therebetween.
Figure 21:
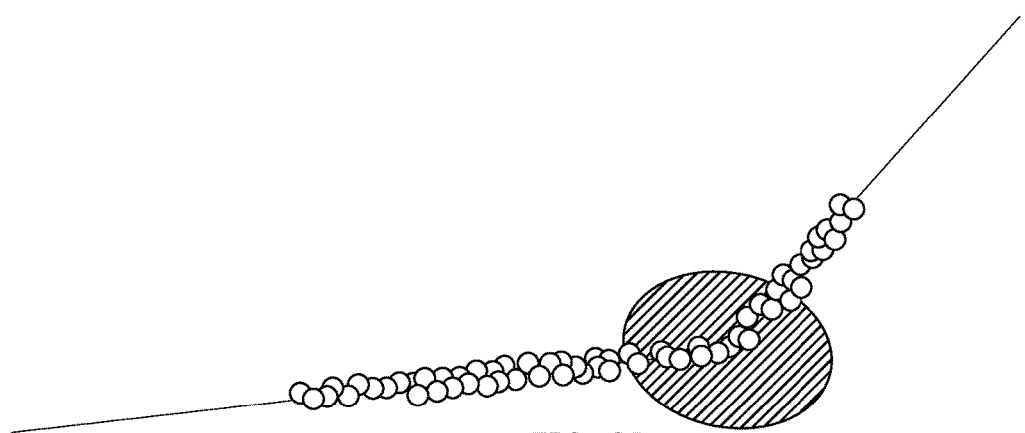
FIG. 21 depicts an estimate for two lines corresponding to the two walls from the data points of FIG. 20.

FIGS. 20 and 21 show an example of the data points and line estimates attained for a 140 degree angle between two walls which could not be obtained using the current state-of-the-art laser range finders.

Figure 22:
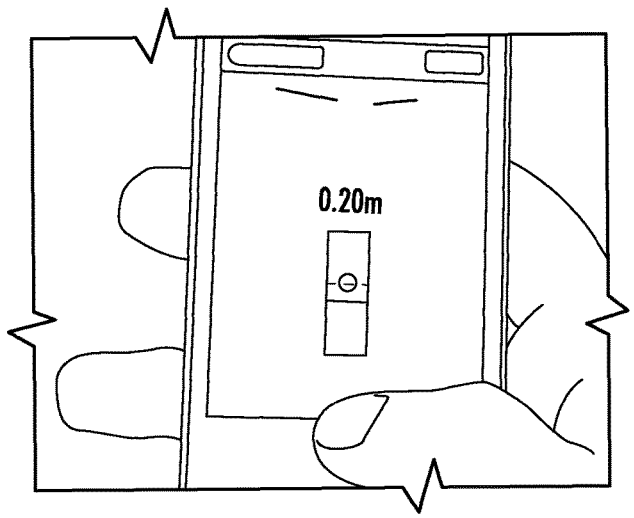
FIG. 22 depicts an embodiment of a user interface for the laser sweep system.

A laser sweep system can be operated via simple user interface on a display of the device itself. In addition, the device may be configured to be connected with other devices, such as smart phones, tablets, and computers, to enable advanced user interfaces. For example, the laser sweep device may be connected wirelessly to a smart device, such as a phone or tablet (e.g., via Bluetooth), and operated through an advanced user interface implemented by an application, or app, on the smart device (FIG. 22). These user interfaces can be used for various purposes, such as visualization of the estimated data only, to give online feedback to the user while sweeping, or to actively interact with the user and leverage from user input.

Figure 23:
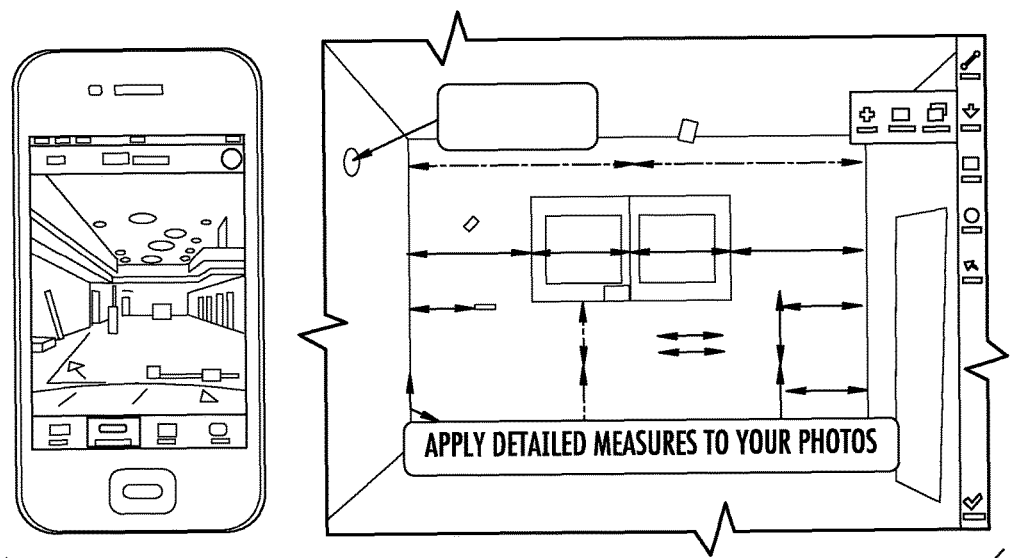
FIG. 23 depicts a camera measuring device and an image produced by the camera measuring device.
Figure 24:
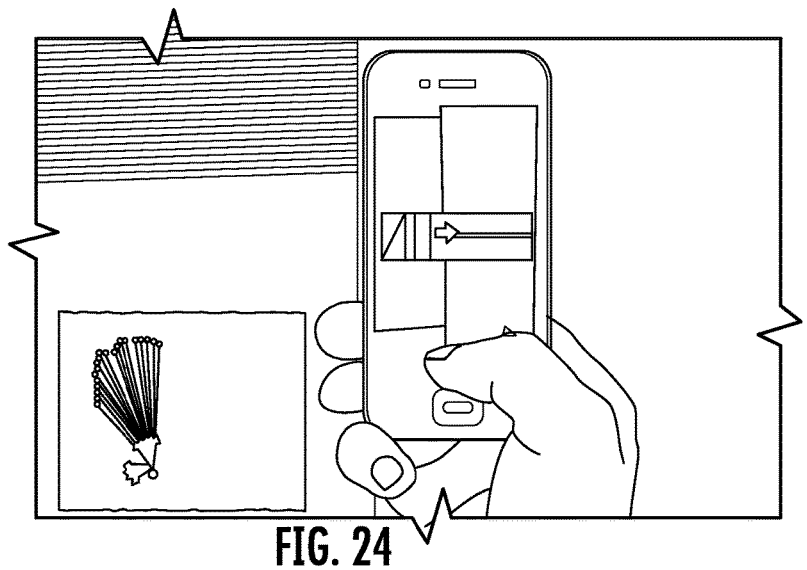
FIG. 24 depicts a camera for a laser sweep device being used to produce a panoramic scan of an area.

The laser sweep system may include an image capturing device, such as a camera (FIG. 23), to enable further types of measurements and data gathering to be performed. Image based measurements, such as depicted in FIG. 23, are known. This disclosure proposes that the laser sweep measurements be used in conjunction with panoramic image processing to generate a corresponding panorama image while sweeping the laser over e.g. a wall (FIG. 24).

Figure 25A:
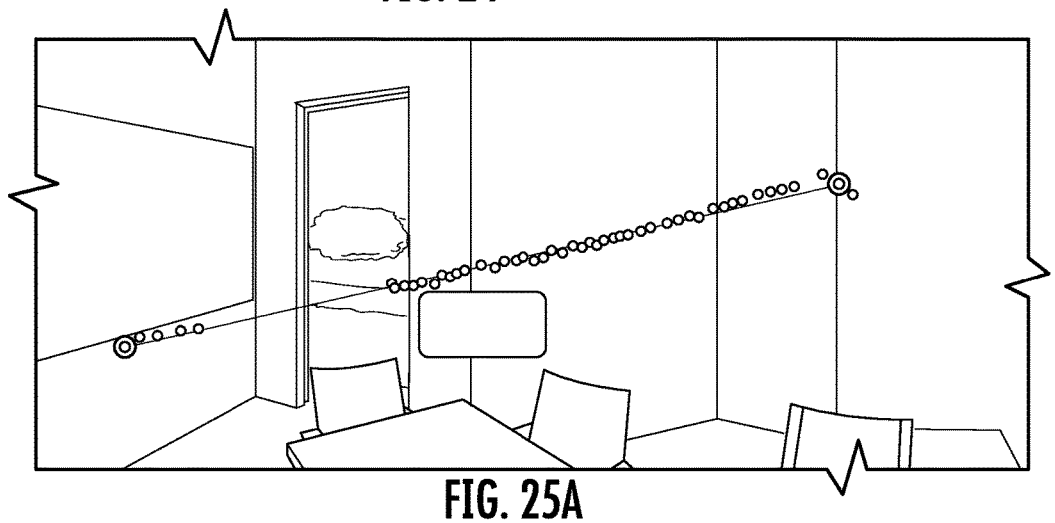
FIGS. 25a and 25b depict examples of scanning sweeps that can be performed for manual calibration of a camera for a laser sweep system.
Figure 25B:
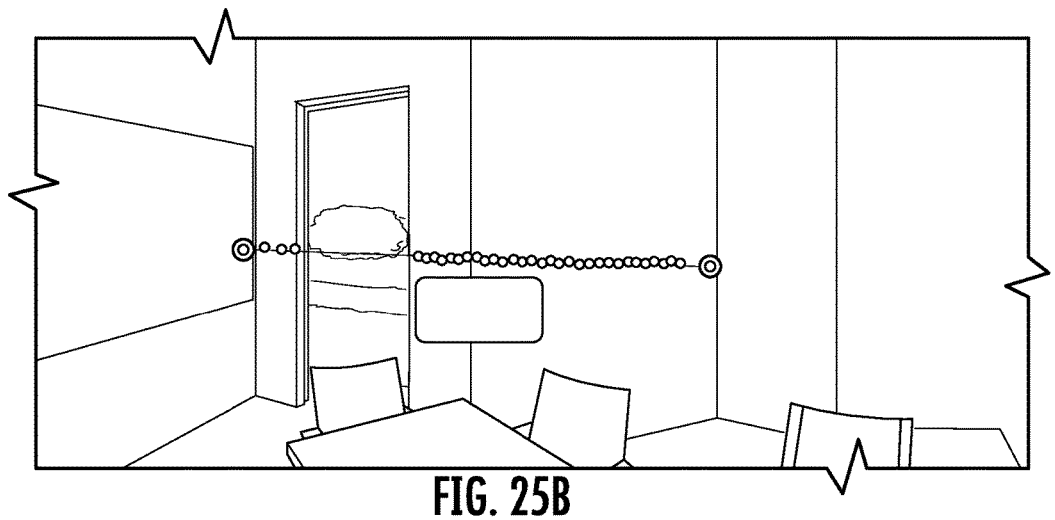

This panorama generation can be done using a smart phone camera or an integrated camera in the device. In case of an integrated camera, the calibration between camera and laser range finder can be provided after manufacturing. In case of a decoupled smart phone based panorama image, a manual calibration process can be performed, e.g., by panning/scaling/rotating the scan line to the right image position (FIGS. 25a and 25b).

Figure 26:
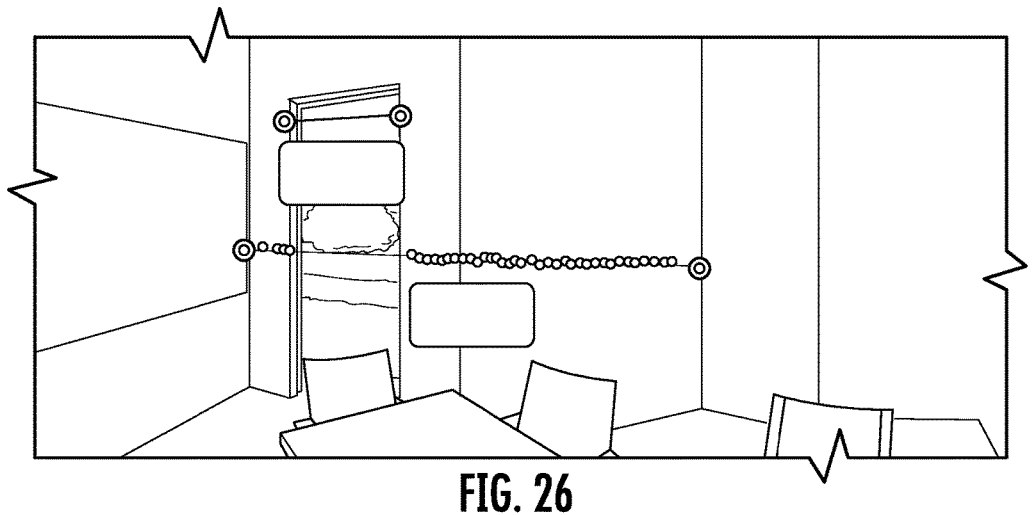
FIG. 26 depicts a sweep after manual calibration has been performed to take additional measurements on the same wall.

The manual calibration can be done intuitively using finger gestures on the smart phone. Once the calibration between panorama and sweep line is known (either through automatic or manual calibration), arbitrary additional metric measures on the same wall can be taken (FIG. 26). This functionality allows for a rapid documentation of measured distances and in addition to that it can be used to measure additional distances on the same wall later on.

In case of an integrated camera solution either through a smart phone accessory (FIG. 27) or through an integrated camera in the laser device, a simultaneous capture of image data and laser range values enables an "on-the-fly" calibration between image and laser range values and an "on-the-fly" documentation of measured distances (FIG. 28).

The image data can support fitting lines and intersection points in the generated 3D point collection. Using image data to guide the search for lines in the 3D point cloud can lead to a more robust and accurate estimate of room primitives. The 3D point cloud can also be used to guide and support the segmentation of the image data onto floors, walls, and other areas.

Furthermore, the image data can be used for automatic feature detection. Features, such as doors, windows, power outlets, light switches and other switches, ceiling lights, HVAC ducts, heating radiators, sprinklers, and the like, can be detected automatically using state of the art image feature recognition and placed automatically in the image and the generated 3D model. If the user would like to have a highly accurate measure of the position of these features, the user can be asked to measure these features again using the laser measurement device.

In addition to use the image data just for visualization and for detecting room features like doors and windows it can be used to stabilize the motion tracking of the laser sweep device. Detecting and tracking of image features (e.g. corner features, line features) enable a vision/photogrammetry based motion tracking using established techniques called visual odometry, structure-from-motion or visual simultaneous localization and mapping. A vision based motion tracking allows larger translational motions during the sweep gesture and it prevents a tracking drift over time, which occurs in case only inertial measurements are being used. In addition the IMU can be used to stabilize the vision based tracking system in environments with scarce visual texture.

Image analysis techniques, such as mentioned above and others, may be built into the system to enable calibration of the device as well as to implement other features. These techniques can be executed by a processor incorporated into the device. Programmed instructions with algorithms for implementing various image analysis techniques, such as 2D and 3D object recognition, image segmentation, motion detection, optical flow, pose estimation, and the like, can be incorporated into the device for execution by the processor in conjunction with the laser sweep measurements discussed above. The processor of the device may be configured to perform any type of analysis on the sensor and image data to enhance or add to the functionality of the device. For example, the photogrammetric analysis of images and/or e.g. edge-detection to support interpretation of laser sweep data or vice versa, may be incorporated into the system.

Using the basic "laser sweep" process described above, the development of more advanced features is possible. For example, the laser sweep enables a simple indirect area measurement by combining one horizontal and one vertical sweep on the same wall (FIGS. 29 and 30). The "negative response" from a laser sweep (e.g. while sweeping over a window area) can be used to detect windows and measure their dimensions (FIG. 31). This negative response information can also be used as prior knowledge for an image based refined window detection. Using advanced computer vision techniques for classification and object recognition the automatic detection of doors, windows, power outlets, etc. would enable an automatic measuring of all those dimensions (FIG. 32).

2D floor plans and 3D models can also be generated from the data collected using the laser sweep system. An example of a process for generating 2D floor plans and 3D models is depicted in FIG. 33. The process begins by sketching the area to that is to be measured (block 1). This can be performed via the user interface of the device itself and saved in the device's memory (block 2). Horizontal distance measurements are performed to determine the lengths of the walls (block 3). These measurements are stored in association with the corresponding walls.

Vertical distance measurements are performed to determine the height of ceiling (block 4). A 3D model may then be generated from the measurements (block 5). The 2D floor plans and 3D models for multiple connected rooms and spaces of a building, for example, can be then be merged (block 6) to produce a combined floor plan and model for the building (block 7).

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of performing geometrical measurements of remote objects, the method comprising:

performing a laser sweep of a measurement object with a handheld sensor device, the handheld sensor device including a distance measurement unit and an inertial measurement unit, the distance measurement unit being configured to measure a distance to a point on the object in a measurement direction, the measurement direction being defined by an orientation of the handheld sensor device;

activating the distance measurement unit to perform a plurality of distance measurements during the laser sweep;

activating the inertial measurement unit to perform an inertial measurement in association with each of the distance measurements;

using a processor to process the distance measurements, wherein the inertial measurements include position and orientation data pertaining to the handheld measuring device, with reference to the associated inertial measurements to determine a geometric characteristic of the measurement object;

using the processor to generate a three-dimensional (3D) point collection for the measurement object from the distance measurements and the associated inertial measurements;

further comprising:
     using the processor to reduce the 3D point collection to a collection of two-dimensional (2D) points;
     using the processor for the detection and segmentation of 2D lines in the 2D point collection;
     using the processor to compute intersection points between the 2D lines; and
     using the processor estimate at least one of:
       a dimension of a wall based on the Euclidian distance between the intersection points; and
       an angle between two walls based on an angle between two intersecting 2D lines.

2. The method of claim 1, wherein the distance measurement unit comprises a laser range finder.

3. The method of claim 1, wherein the distance measurement unit and the inertial measurement unit are activated at a frequency of at least 30 Hz.

4. The method of claim 1, wherein the processor is configured to take user characteristics into consideration in determining the geometric characteristic of the measurement object, the user characteristics comprising at least one of a forearm length and a distance between a wrist of the user and the laser range finder.

5. The method of claim 1, wherein activating the distance measuring unit further comprises:
   activating the distance measuring unit via a user interface of the handheld measuring device.

6. The method of claim 5, wherein the user interface comprises a touch screen interface.

7. The method of claim 5, further comprising:
   wirelessly transmitting at least one of the distance measurements, the inertial measurements, and the geometric characteristic to a remote device.

8. The method of claim 7, wherein the remote device comprises a smart device.

9. The method of claim 1, wherein the handheld sensing device further comprises an image capturing device, and the method further comprises:
   activating the image capturing device to capture a panoramic image during the laser sweep; and
   using the processor to associate distance measurements with points in the panoramic image.

10. A handheld sensing device comprising:
a portable housing defining a measurement direction:
a distance measurement unit supported by the housing and configured to measure a distance to a remote point in the measurement direction;
an inertial measurement unit supported by the housing and configured to perform an inertial measurement in association with each distance measurement and comprising at least one of an accelerometer, a gyroscope, and a compass; and
a processor configured
   to process the distance measurements with reference to the associated inertial measurements to determine a geometric characteristic of a measurement object,
   to generate a three-dimensional (3D) point collection for the measurement object from the distance measurements and the associated inertial measurements;
wherein the processor is further configured:
   to reduce the 3D point collection to a collection of two-dimensional (2D) points;
   to perform detection and segmentation of 2D lines in the 2D point collection:
   to compute intersection points between the 2D lines; and
   to estimate at least one of:
      a dimension of a wall based on the Euclidian distance between the intersection points; and
      an angle between two walls based on an angle between two intersecting 2D lines.

11. The handheld sensing device of claim 10, wherein the distance measurement unit comprises a laser range finder.

12. The handheld sensing device of claim 10, wherein the processor is configured to generate a 3D point collection for the measurement object from the distance measurements and the associated inertial measurements.

13. The handheld sensing device of claim 10, further comprising an image capturing device configured to capture a panoramic image of the measurement object, and
wherein the processor is configured to associate distance measurements with points in the panoramic image.

* * * * *

UNITED STATES PATENT AND TRADEMARK OFFICE
CERTIFICATE OF CORRECTION

PATENT NO. : 10,060,730 B2
APPLICATION NO. : 15/033011
DATED : August 28, 2018
INVENTOR(S) : Roland et al.

Page 1 of 1

It is certified that error appears in the above-identified patent and that said Letters Patent is hereby corrected as shown below:

In the Claims

In Column 10, Lines 1-2, Lines 21-22 of Claim 10 should read:
to perform detection and segmentation of 2D lines in
    the 2D point collection;

Signed and Sealed this
Twenty-ninth Day of January, 2019

Andrei Iancu
*Director of the United States Patent and Trademark Office*